United States Patent [19]
Van de Waterlaat et al.

[11] Patent Number: 5,534,932
[45] Date of Patent: Jul. 9, 1996

[54] LETTERBOX TELEVISION SYSTEM

[75] Inventors: Adrianus C. J. G. Van de Waterlaat, Adrianus; Franciscus Vreeswijk; Theodora L. Hamann, both of Eindhoven, all of Netherlands

[73] Assignee: U.S. Philips Corporation, New York, N.Y.

[21] Appl. No.: 342,683

[22] Filed: Nov. 21, 1994

Related U.S. Application Data

[63] Continuation of Ser. No. 248,825, May 24, 1994, abandoned, which is a continuation of Ser. No. 106,094, Aug. 12, 1993, abandoned.

[30] Foreign Application Priority Data

Aug. 13, 1992 [EP] European Pat. Off. ............. 92202496

[51] Int. Cl.$^6$ .................................................. H04N 11/00
[52] U.S. Cl. ........................ 348/432; 348/436; 348/473; 348/486
[58] Field of Search ...................... 348/913, 432, 348/437, 438, 473, 486, 436; H04N 11/00

[56] References Cited

U.S. PATENT DOCUMENTS 5,068,728  11/1991  Macovski .................................. 358/142
5,387,939  2/1995  Naimpally ................................ 348/437

FOREIGN PATENT DOCUMENTS 0357144  3/1990  European Pat. Off. .
0460750  12/1991  European Pat. Off. .
5114346  9/1991  WIPO ............................. H04N 11/00

*Primary Examiner*—Victor R. Kostak
*Assistant Examiner*—Nathan J. Flynn
*Attorney, Agent, or Firm*—Laurie E. Gatham

[57] ABSTRACT

In a method of transmitting an extended television signal comprising a wide aspect ratio picture between two horizontal bars so as to form a standard aspect ratio picture, in which vertical resolution enhancement signals are transmitted to improve the vertical resolution upon display on an enhanced television receiver, this method comprises the steps of separating the vertical resolution enhancement signals into a low-frequency part (DC-1.5 MHz) and a high-frequency part (1.2-2.9 MHz); transmitting the high-frequency part during the horizontal bars, which high-frequency part is not modulated onto a subcarrier; and transmitting the low-frequency part during the horizontal bars after modulation onto a subcarrier (4.43 MHz).

13 Claims, 3 Drawing Sheets

LETTERBOX TELEVISION SYSTEM

This is a continuation of application Ser. No. 08/248,825, filed May 24, 1994 which is a continuation of application Ser. No. 08/106,094, filed Aug. 12, 1993, both abandoned.

BACKGROUND OF THE INVENTION

The invention relates to a letterbox television system, i.e. a television system in which a wide aspect ratio picture is transmitted between two horizontal bars so as to form a standard aspect ratio picture. In such a television system, vertical resolution enhancement signals are transmitted to improve the vertical resolution upon display on an enhanced wide aspect ratio television receiver, while these signals are transmitted in such a way that they are as invisible as possible to the viewer of a current standard aspect ratio television receiver. More specifically, the invention relates to the manner of transmitting the vertical enhancement signals.

EP-A-0,357,144 discloses a letterbox television system of the type described in the opening paragraph. The vertical resolution enhancement signals are low-pass filtered up to 1.25 MHz because only a low-pass portion of the enhancement signals may be modulated onto the quadrature sideband of the picture carrier. The remaining high-frequency part above 1.25 MHz of the vertical resolution enhancement signals is transmitted in the horizontal bars. Modulation of the quadrature sideband of the picture carrier has a number of drawbacks. First, it is a rather complex technique. Secondly, modulation of the quadrature sideband of the picture carrier disturbs the phase of the picture carrier so that the automatic frequency control loop in existing receivers will probably be disturbed. Thirdly, when intercarrier sound decoding is used, the phase deviations caused by the quadrature modulation of the picture carder are likely to render sound demodulation problematic.

To solve these problems, EP-A-0,460,750 discloses a letterbox television system in which the vertical resolution enhancement signals are only transmitted during the horizontal bars. The vertical resolution enhancement signals are modulated onto a subcarrier to reduce any low-frequency components which would be too visible upon display on a current standard aspect ratio television receiver, and to mitigate compatibility problems with synchronizing circuits in existing transmitters and receivers. Unfortunately, the fact that the visible wide aspect ratio part of the letterbox television signal is transmitted directly while the vertical resolution enhancement signals are transmitted in a modulated form, causes phase differences between, for example, a 3 MHz component which is transmitted in the visible wide aspect ratio part of the letterbox television signal on the one hand, and on the other hand a 3 MHz component which is transmitted in the horizontal bars at a frequency of 4.43–3=1.43 MHz after modulation onto a 4.43 MHz subcarrier.

SUMMARY OF THE INVENTION

It is, inter alia, an object of the invention to provide a letterbox television system which offers a less problematic transmission of the vertical resolution enhancement signals. To this end, a first aspect of the invention provides a transmission method wherein the low-frequency part of the vertical enhancement signals is modulated onto a subcarrier and transmitted during the horizontal bars without transmitting the high-frequency part; a second aspect of the invention provides a receiving apparatus which combines the unmodulated high-frequency part with the modulated low-frequency part; while third aspect of the invention provides a television signal which includes a low-frequency part of the vertical resolution enhancement signals modulated onto a subcarrier and being transmitted during said horizontal bars without transmitting the high frequency part during said horizontal bars. Advantageous, embodiments of the invention are defined in the subclaims.

Since the high-frequency part of the vertical resolution enhancement signals, which will first be degraded by group delay effects caused by the modulation, is now transmitted in an unmodulated manner, the phase difference problem is practically solved. The modulation of the low-frequency part ensures that the signals encoded into the horizontal bars are still invisible to the viewer of a current standard aspect ratio television receiver.

In a simplified embodiment of the transmission method, the high-frequency part is not transmitted. In a likewise simplified embodiment of the receiving apparatus, the high-frequency part retrieving means are omitted.

These and other aspects of the invention will be apparent from and elucidated with reference to the embodiments described hereinafter.

DETAILED DESCRIPTION OF THE PREFERRED EMBODIMENTS OF THE INVENTION

Figure 1:
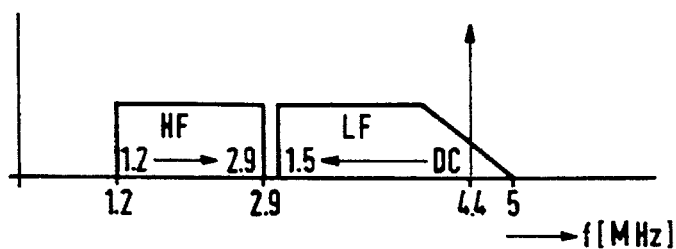
FIG. 1 shows a frequency diagram of an encoded vertical resolution enhancement signal in accordance with the present invention.

The frequency diagram of FIG. 1, shows the processed horizontal bar signal. A low-frequency part LF (from 0 Hz to 1.5 MHz) of the vertical resolution enhancement signals is modulated onto the color subcarrier at 4.43 MHz. Around 4.43 MHz a Nyquist edge is shown. After modulation, the highest frequency (1.5 MHz) of the low-frequency part LF is at 2.9 MHz. A high-frequency part HF (from 1.2 to 2.9 MHz) of the vertical resolution enhancement signals is transmitted directly, without modulation. The low-frequency part LF and the high-frequency part HF thus show an overlap from 1.2 to 1.5 MHz.

Figure 2:
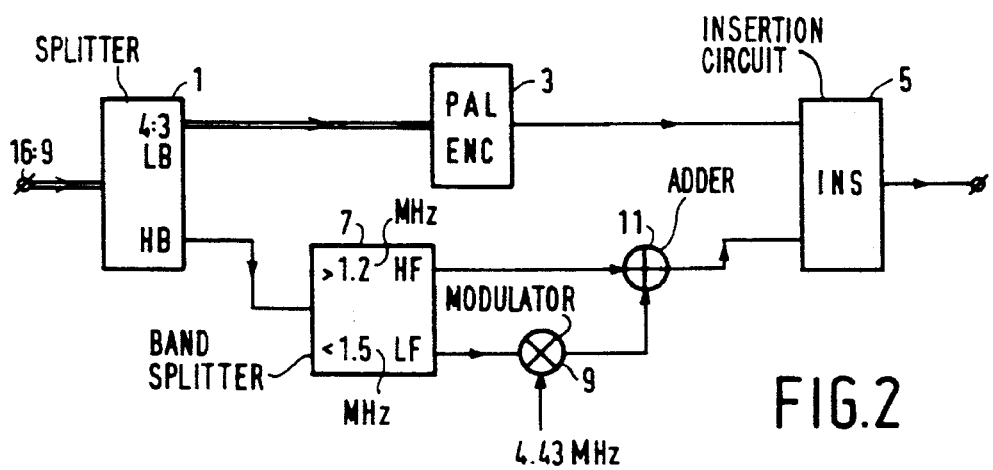
FIG. 2 shows a basic block diagram of an encoder in accordance with the present invention.

In the encoder block diagram of FIG. 2, 16:9 aspect ratio source signals (luminanee and chrominance) are applied to a splitter 1. The splitter 1 furnishes 4:3 aspect ratio letterbox signals LB to a PAL encoder 3, and vertical resolution enhancement horizontal bar signals HB to a band-splitter 7. The band-splitter 7 furnishes low-frequency signals LF (up to 1.5 MHz) to a modulator 9 for modulation at the color subcarrier frequency of 4.43 MHz. The band-splitter 7 also furnishes high-frequency signals HF (from 1.2 MHz) to a first input of an adder 11, whose other input receives the modulated subcarrier from the modulator 9. An insertion circuit 5 inserts the processed vertical resolution enhancement signals from the adder 11 into the PAL encoded signals from the PAL encoder 3, so as to form a standard aspect ratio signal having a wide aspect ratio center portion between horizontal bars which convey vertical resolution enhancement signals.

Figure 3:
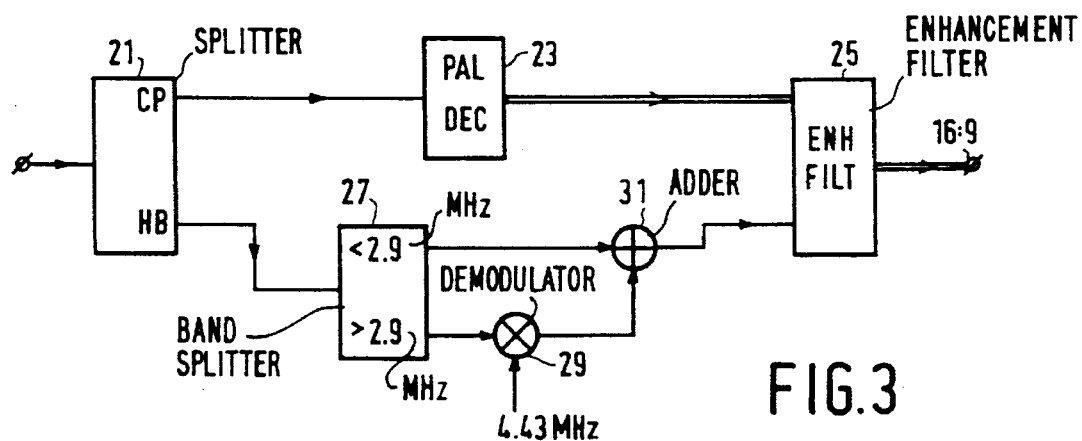
FIG. 3 shows a basic block diagram of a decoder in accordance with the present invention.

In the decoder block diagram of FIG. 3, a splitter 21 separates the wide aspect ratio center part CP and the horizontal bar signal HB of the received letterbox television signal. The center part CP is applied to a PAL demodulator 23 which supplies the luminance and chrominance signals to an enhancement filter 25. The horizontal bar signal HB is applied to a band-splitter 27. The band-splitter 27 applies the signal frequencies up to 2.9 MHz conveying the high-frequency part HF of the vertical resolution enhancement signals to an adder 31, while the signal frequencies above 2.9 MHz are applied to a demodulator 29 which applies the low-frequency part LF of the vertical resolution enhancement signals to the adder 31. The adder 31 applies the recovered vertical resolution enhancement signals to the enhancement filter 25. The enhancement filter combines the vertical resolution enhancement signals and the signals received from the PAL demodulator 23 so as to create wide aspect ratio (16:9) image luminance and chrominance signals.

Figure 4:
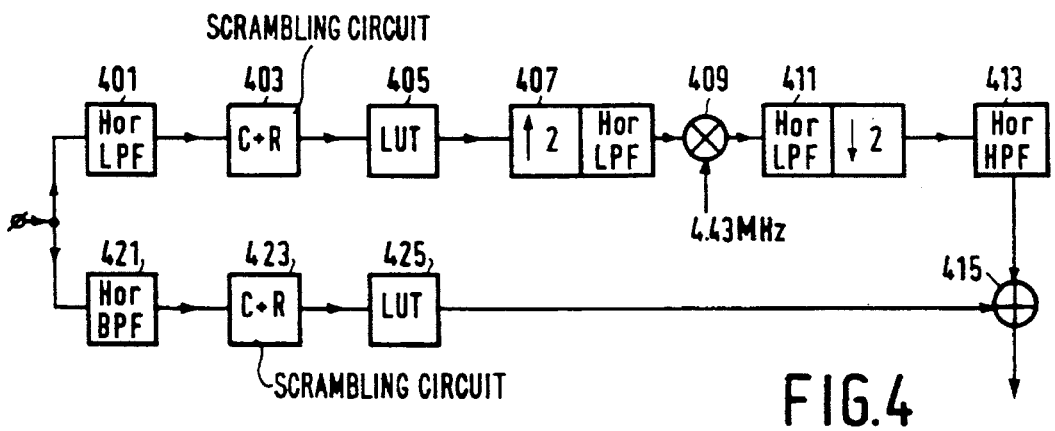
FIG. 4 shows a block diagram of the vertical resolution enhancement path of a preferred embodiment of an encoder in accordance with the present invention.
Figure 6:
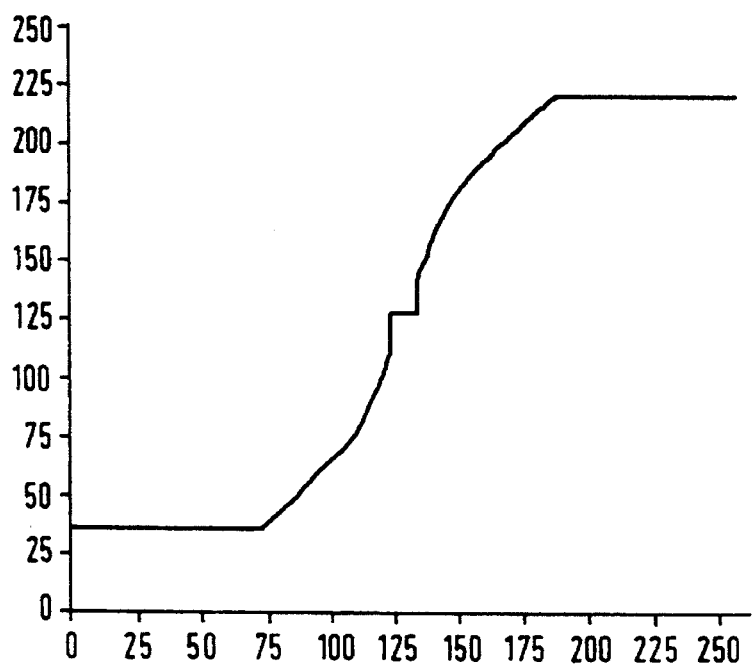
FIG. 6 shows the contents of an expanding look-up table for use in the encoder of FIG. 4.

In the encoder vertical resolution enhancement signal path shown in FIG. 4, a horizontal low-pass filter 401 selects the low-frequency part of the vertical resolution enhancement signals. The output of the low-pass filter 401 is coupled to an optional scrambling circuit 403 which operates in accordance with the cut-and-rotate scrambling technique and serves to reduce the correlation between the enhancement signal and the visible image so that no objects can be recognized in the horizontal bars. The output of the scrambling circuit 403 is coupled to a look-up table (LUT) PROM 405 in which an expanding curve as shown in FIG. 6 is stored. The expansion serves to prevent a noise break-through which may occur due; to the transmission of the vertical resolution enhancement signal in the horizontal bars at an amplitude which is compressed to increase the compatibility of the vertical resolution enhancement signal in existing transmitters and receivers. The noise break-through is prevented by relating input values, which differ from the value 128 by a certain amount, to output values which differ from the value 128 by a larger amount. In a preferred embodiment, only input values which differ from the value 128 by a certain amount exceeding a given threshold are related to output values, which differ from the value 128 by a larger amount. The output of the LUT circuit 405 is coupled to a sampling rate doubler and horizontal low-pass filter 407 preceding a modulator at the color subcarrier frequency 409 and a horizontal low-pass filter and sampling rate halving circuit 411. The sampling rate is temporarily doubled to avoid fold-back components which would be very disturbing. The circuit 411 precedes a horizontal low-pass filter 413.

The vertical resolution enhancement signal is also applied to a horizontal bandpass filter 421 which selects the high-frequency part of the enhancement signals. The bandpass filter 421 precedes an optional cut-and-rotate scrambling circuit 423 and a LUT circuit 425 which correspond to the circuits 403 and 405, respectively. Finally, the outputs of the circuits 413 and 425 are summed by an adder 415. The adder 415 precedes a circuit (not shown) which converts the digital sum signal into an analog signal having a maximum peak-to-peak amplitude of 150 mV.

Figure 5:
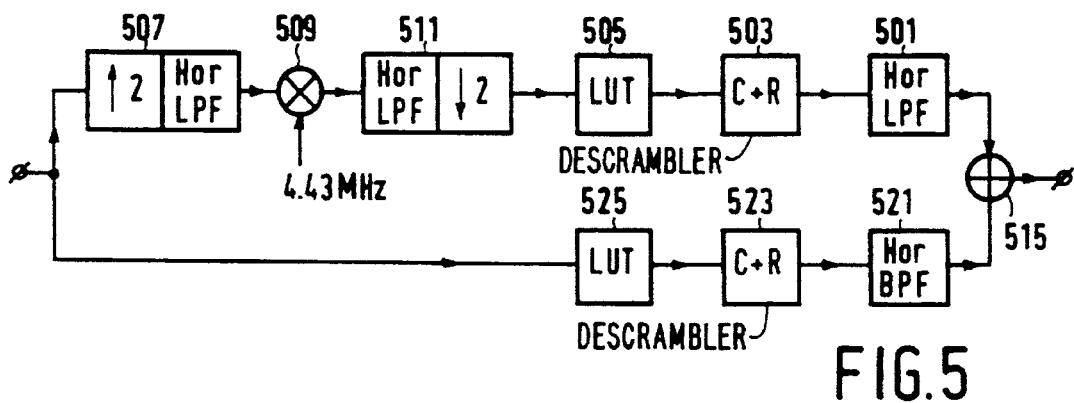
FIG. 5 shows a block diagram of the vertical resolution enhancement path of a preferred embodiment of a decoder in accordance with the present invention.

In the decoder vertical resolution enhancement signal path shown in FIG. 5, a first branch comprises a sampling rate doubler and horizontal low-pass filter 507, preceding a demodulator at the color subcarrier frequency 509 and a horizontal low-pass filter and sampling rate halving circuit 511, similar to the circuits 407, 409 and 411, respectively, in the encoder of FIG. 4. The circuit 511 precedes a LUT circuit 505 in which a companding curve shown in FIG. 7 and complementary to the expanding curve of FIG. 6 is stored. The LUT circuit 505 precedes a cut-and-rotate descrambler 503 and a horizontal low-pass filter circuit 501. While the demodulator 509 demodulates all of the horizontal bar signals, the low-pass filter 501 selects the low-frequency part of the enhancement signals which were modulated onto the color subcarrier.

A second branch of the decoder enhancement signal path comprises a LUT circuit 525, a cut-and-rotate descrambler 523 and a horizontal bandpass filter circuit 521. The LUT circuit 525 and the descrambler 523 resemble the circuits 505 and 503, respectively. While all of the horizontal bar signals are processed by the circuits 525 and 523, the bandpass filter 521 selects the high-frequency part of the enhancement signals. Finally, an adder 515 combines the low-frequency part from the low-pass filter 501 and the high-frequency part from the bandpass filter 521.

In both the encoder path of FIG. 4 and the decoder path of FIG. 5, the low-pass and bandpass filters separating the modulating low-frequency part branch and the non-modulating high-frequency branch are quadrature mirror filters to provide a good reconstruction at the transition frequency between the low-frequency part of the enhancement signals, which part has been subjected to two low-pass filtering operations (one in the encoder and one in the decoder), and the high-frequency part of the enhancement signals, which part has been subjected to two band-pass filtering operations (one in the encoder and one in the decoder).

Figure 7:
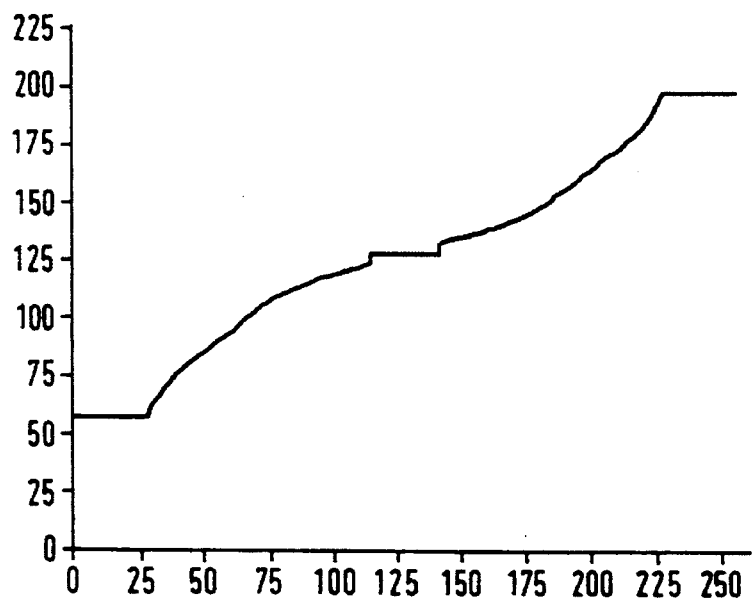
FIG. 7 shows the contents of a companding look-up table for use in the decoder of FIG. 5.
Figure 8:
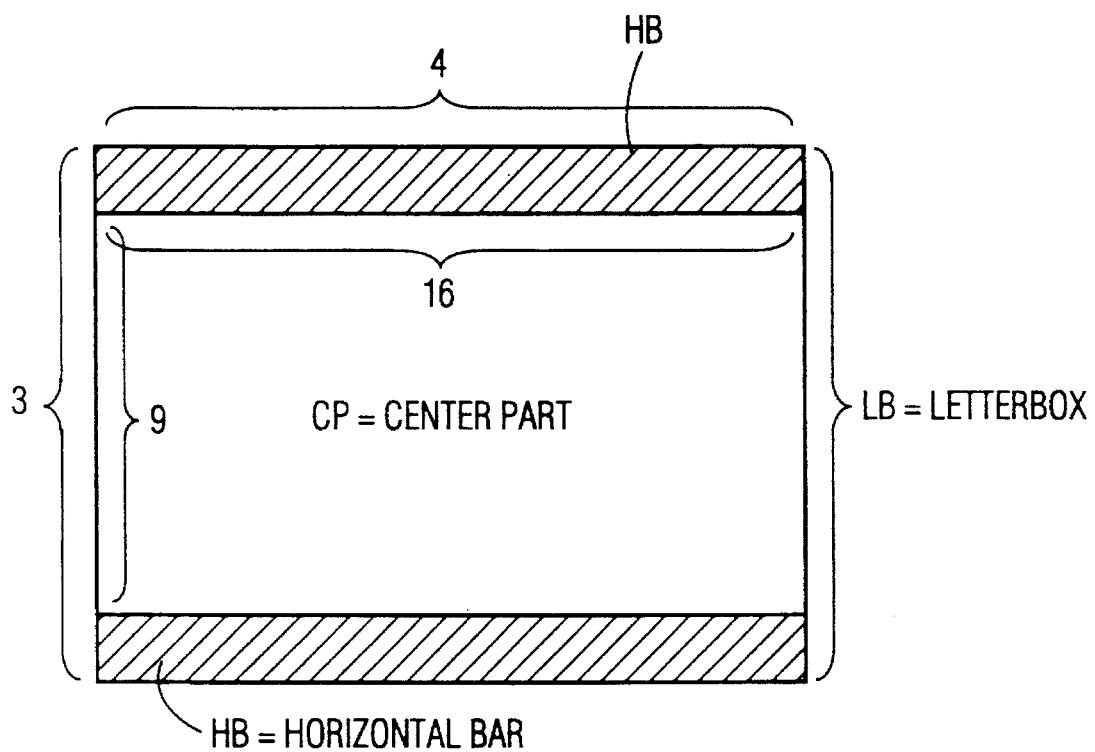
FIG. 8 shows the letterbox configuration.

The expander and compander curves shown in FIGS. 6 and 7 are chosen to be such that the maximum amplitude obtained after adding the output signals of the low-frequency part and high-frequency part branches in the encoder does not become too large at the transition frequency between the low-frequency and high-frequency parts of the enhancement signal. In the expanding curve of FIG. 6, the maximum difference between the digital center value 128 and the extreme digital values is reduced to about 90; the companding curve of FIG. 7 has been adjusted correspondingly.

It should be noted that the above-mentioned embodiments illustrate rather than limit the invention, and that those skilled in the art will be able to design many alternative embodiments without departing from the scope of the appended claims.

We claim:

1. A method of transmitting an extended television signal including a wide aspect ratio picture between two horizontal bars which forms a standard aspect ratio picture, and wherein vertical resolution enhancement signals are transmitted to improve the vertical resolution upon display of said standard aspect ratio picture on an enhanced television receiver, said method comprising the steps of:

separating said vertical resolution enhancement signals into a low-frequency part and a high-frequency part;

modulating the low-frequency part onto a subcarrier; and transmitting the modulated low-frequency part during said horizontal bars without transmitting the high-frequency part during said horizontal bars.

2. A transmission method as claimed in claim 1, further including the step of transmitting the high-frequency part during said horizontal bars, without modulating the high-frequency part onto the subcarrier.

3. A transmission method as claimed in claim 2, further including the step of expanding the modulated low-frequency part to reduce maximum differences between output values of the modulated low frequency part and a center output value of the modulated low frequency part for preventing an excessive amplitude of the vertical resolution enhancement signals at a transition frequency between the high-frequency part and the modulated low-frequency part.

4. A receiving apparatus for an extended television signal, said receiving apparatus comprising:

a device for receiving an extended television signal including a wide aspect ratio picture between two horizontal bars which forms a standard aspect ratio picture, and wherein vertical resolution enhancement signals have been transmitted to improve the vertical resolution upon display of said standard aspect ratio picture on an enhanced television receiver, said vertical resolution enhancement signals including both a low-frequency part modulated onto a subcarrier and a high-frequency part, the low and high-frequency parts being transmitted during said horizontal bars;

means for demodulating the low-frequency part of the vertical resolution enhancement signals;

means for retrieving the high-frequency part of the vertical resolution enhancement signals; and means for combining the high-frequency part, the demodulated low-frequency part and said wide aspect ratio picture to obtain an enhanced wide aspect ratio picture.

5. A receiving apparatus for an extended television signal, said receiving apparatus comprising:

a device for receiving an extended television signal including a wide aspect ratio picture between two horizontal bars which forms a standard aspect ratio picture, the extended signal also including vertical resolution enhancement signals to improve the vertical resolution upon display of said standard aspect picture on an enhanced television receiver, the vertical resolution enhancement signals having both a low-frequency part modulated onto a subcarrier and a high-frequency part not modulated on the subcarrier, the low and high-frequency parts being transmitted during said horizontal bars, means for demodulating the low-frequency part of the vertical resolution enhancement signals; and means for combining the demodulated low-frequency part and said wide aspect ratio picture to obtain an enhanced wide aspect ratio picture.

6. A receiving apparatus as claimed in claim 4, wherein said demodulating means includes means for demodulating all of said horizontal bars, and low-pass filter means coupled to said demodulating means for furnishing said low-frequency part of said vertical resolution enhancement signals.

7. A receiving apparatus as claimed in claim 4, further including means for companding the low-frequency part which includes means for receiving the low-frequency part and means for outputting output values for reducing the maximum differences between the output values and a center value of the output values.

8. A receiving apparatus as claimed in claim 5, wherein said demodulating means includes means for demodulating all of said horizontal bars, and low-pass filter means coupled to said demodulating means for furnishing said low-frequency part of said vertical resolution enhancement signals.

9. A receiving apparatus as claimed in claim 5, further including means for companding the low-frequency part which includes means for receiving the low-frequency part and means for outputting output values for reducing the maximum differences between the output values and a center value of the output values.

10. A receiving apparatus as claimed in claim 8, further including means for companding the low-frequency part which includes means for receiving the low-frequency part and means for outputting output values for reducing the maximum differences between the output values and a center value of the output values.

11. A receiving apparatus for an extended television signal, said receiving apparatus comprising:

a device for receiving an extended television signal including a wide aspect ratio picture between two horizontal bars which forms a standard aspect ratio picture, the extended signal also including vertical resolution enhancement signals to improve the vertical resolution upon display of said standard aspect ratio picture on an enhanced television receiver, the vertical resolution enhancement signals having both a low-frequency part modulated onto a subcarrier and a high-frequency part, the low frequency part having been transmitted during said horizontal bars without the high frequency part being transmitted;

means for demodulating the low-frequency part of the vertical resolution enhancement signals; and means for combining the demodulated low-frequency part and said wide aspect ratio picture to obtain an enhanced wide aspect ratio picture.

12. A receiving apparatus as claimed in claim 11, wherein said demodulating means includes means for demodulating all of said horizontal bars, and low-pass filter means coupled to said demodulating means for furnishing said low-frequency part of said vertical resolution enhancement signals.

13. A method of transmitting an extended television signal including a wide aspect ratio picture between two horizontal bars which forms a standard aspect ratio picture, and wherein vertical resolution enhancement signals are transmitted to improve the vertical resolution upon display of said standard aspect ratio picture on an enhanced television receiver, said method comprising the steps of:

separating said vertical resolution enhancement signals into a low-frequency part and a high-frequency part;

modulating the low-frequency part onto a subcarrier;

transmitting the modulated low-frequency part during said horizontal bars; and transmitting the high-frequency part during said horizontal bars, without modulating the high-frequency part onto the subcarrier.

* * * * *